United States Patent [19]
Caillaut et al.

[11] Patent Number: 5,293,124
[45] Date of Patent: Mar. 8, 1994

[54] SENSING DEVICE FOR DETECTING THE ROTATIONAL SPEED OF A ROTATING ELEMENT MOUNTED ON A NON-ROTATING ELEMENT BY MEANS OF A BEARING

[75] Inventors: Claude Caillaut, Saint Roch; Christophe Houdayer, Tours; Pascal Lhote, Saint Cyr sur Loire; Christian Rigaux, Artannes sur Indre, all of France

[73] Assignee: SKF France, Clemart Cedex, France

[21] Appl. No.: 814,625

[22] Filed: Dec. 30, 1991

[30] Foreign Application Priority Data

Jan. 10, 1991 [FR] France ................... 91 00233

[51] Int. Cl.⁵ ............................ G01P 3/48; G01P 3/54; G01B 7/14
[52] U.S. Cl. ................................. 324/173; 324/174; 324/207.22
[58] Field of Search .............. 324/207.11, 207.15, 324/207.22, 207.25, 207.13, 173, 174; 384/448

[56] References Cited

U.S. PATENT DOCUMENTS

| | | | |
|---|---|---|---|
| 4,988,220 | 1/1991 | Christiansen | 324/207.25 |
| 5,004,358 | 4/1991 | Varuello et al. | 384/448 |

FOREIGN PATENT DOCUMENTS

| | | |
|---|---|---|
| 357870 | 3/1990 | European Pat. Off. |
| 378939 | 7/1990 | European Pat. Off. |
| 394083 | 10/1990 | European Pat. Off. |
| 3809904 | 5/1989 | Fed. Rep. of Germany |

*Primary Examiner*—Walter E. Snow
*Attorney, Agent, or Firm*—Beveridge, DeGrandi, Weilacher & Young

[57] ABSTRACT

Device for sensing the rotational speed of a rotating element (4) mounted by means of a roller bearing on a non-rotating element (3), comprising a multipolar ring (17) which is integral with the rotating element, a sensor (19) which is made integral with the non-rotating element, and a magnetic flux concentrating means arranged in the immediate vicinity of the multipolar ring and cooperating with the sensor in order to concentrate and channel the magnetic flux emitted by the multipolar ring. The flux concentrating means is of annular shape and comprises at least a first end shield (24) having a radial part of which one circular edge is provided on its circumference with a sealing lip (25) intended for coming into contact directly or indirectly with the rotating element (4), and a second end shield (26) provided with radial teeth (27) spaced regularly along a circular path. The multipolar ring is axially magnetised and arranged in the axial space included between the radial part of the first end shield on the one hand and the radial teeth of the second end shield on the other hand, so that the radial teeth are all situated axially opposite the magnetic poles of the same polarity of the multipolar ring.

13 Claims, 5 Drawing Sheets

SENSING DEVICE FOR DETECTING THE ROTATIONAL SPEED OF A ROTATING ELEMENT MOUNTED ON A NON-ROTATING ELEMENT BY MEANS OF A BEARING

The present invention relates to a device for sensing the rotational speed of a rotating element which is mounted on a non-rotating element by means of a roller bearing, the rotational speed being determined by detecting magnetic field variations. The device of the invention can be used in particular for detecting the rotational speed of a roller bearing for a wheel hub which is associated for example with an antilocking brake system (ABS).

Devices of this type generally comprise a coding element which produces a magnetic field by means of a multipolar ring which is made integral with the rotating element, and a sensor which is sensitive to magnetic field variations which is made integral with the non-rotating element and arranged with an air gap opposite the coding element.

It is known that the functioning of such a device is dependent on a certain number of technical constraints. In fact, the detection signal supplied by the sensor must be as powerful and as regular as possible for a data management and processing system to be able to supply a correct interpretation of the signal with respect to reality. The result is that the signal supplied by the sensor has to be as insensitive as possible to air gap variations between the coding element and the sensor. Such air gap variations are linked directly to the precision with which the device is mounted in practice.

It is also necessary for the device to be well protected from pollution and possible projections originating from the external environment in order to eliminate a direct source of disturbance of the signal supplied by the sensor.

Another factor to be considered is that in practice the device often has to be of compact volume in order to be integrated in mechanical assemblies, notably roller bearings or roller bearing hubs.

The French Patent 2,558,223 discloses a roller bearing with information sensor comprising one or more sensors arranged axially opposite a coding disc which bears one or two series of magnetic scales spaced annually on its periphery. The rotation of the coding disc with the rotating ring of the roller bearing is translated by the magnetic scales passing in front of the sensor or sensors which generate a signal representing the speed of rotation. This document provides sealing means for protecting the device from the external environment. However, the axial arrangement of the sensor opposite the coding disc is cumbersome and makes the sensor/coding disc assembly difficult to integrate in a roller bearing in practice. Furthermore, it seems that the signal generated by the sensor is sensitive to air gap variations between the sensor and the coding disc.

In a similar manner, the French Patent Application 2,640,706 shows an information sensor roller bearing in which the sensor is supported by a drum projecting axially with respect to the roller bearing. Such a device constitutes a relatively important axial spatial requirement and does not comprise sealing means permitting the sensor and the coding element to be protected from various pollutants of the external environment. The sensitivity of the signal generated by the sensor to air gap variations between the sensor and the coding element appears equally important for the device shown in this document.

The French Patent Application 2,642,122 also discloses a rotational speed sensing device with the coding element in the form of a multipolar ring integrated in a sealing joint of an information sensor roller bearing. This device also has the disadvantage of having a significant axial spatial requirement and a high degree of sensitivity of the signal generated by the sensor to air gap variations between the sensor and the coding element.

From the French Patent Application 2,263,518 another type of sensor device is known in which the sensor consists of an induction coil housed in an annular element forming a magnetic flux concentrator with two toothed radial end shields. A multipolar ring concentric to the winding of the sensor passes in rotation radially in front of the teeth of the flux concentrator in order to cause variations in induced current in the winding, the frequency of this signal being proportional to the speed of rotation. However, this document does not show a sealing means for protecting the device which, moreover, remains sensitive to air gap variations between the teeth of the flux concentrating element and the multipolar ring. In addition, no technical means has been mentioned to permit the use of the device as described for measuring the rotational speed of a rotating element.

The present invention has the object of overcoming the disadvantages of the conventional devices by producing a rotational speed sensing device which is small in volume, has a good sealing with respect to the external environment and permits a reliable, regular and powerful signal to be supplied.

The invention also has the object of reducing the axial spacial requirement of the speed sensing device.

A further object of the invention is to obtain a signal generated by the sensor which is practically insensitive to air gap variations between the sensor and the coding element.

In addition, the subject of the invention is a speed sensing device in which the magnetic flux produced by the multipolar ring is channelled towards the sensor with a minimum of loss.

The device for sensing the rotational speed of a rotating element mounted by means of a roller bearing on a non-rotating element according to the invention comprises a coding element which is integral with the rotating element and produces an alternating magnetic field by means of a multipolar ring having a plurality of alternating and regular magnetic poles, a sensor which is sensitive to variations in magnetic field and integral with the non-rotating element, and a magnetic flux concentrating means arranged in the immediate vicinity of the multipolar ring and cooperating with the sensor in order to concentrate and channel the magnetic flux emitted by the multipolar ring. According to the invention, the flux concentrating means is produced in an annular shape and comprises at least a first end shield having a radial part of which one circular edge is provided on its circumference with a sealing lip intended for coming into direct or indirect contact with the rotating element, and a second end shield provided with radial teeth spaced regularly in the circumferential direction. The first and second end shields being arranged axially spaced from one another. The sensor is made integral with at least the first end shield of the magnetic flux concentrating means and preferably arranged between the first and second end shields. The multipolar ring is preferably axially magnetised and is arranged between the axial space included between the radial part of the first end shield on the one hand and the radial teeth of the second end shield on the other hand, so that the radial teeth are all situated axially opposite the magnetic poles of the same polarity of the multipolar ring.

The sensor can be of the passive type such as an induction coil. It may also be of the active type such as a Hall-effect probe, a magnetoresistor or similar.

The second end shield provided with teeth can be made integral with the sensor and with the first end shield by encapsulating it with plastic material in order to obtain a rigid annular block. The block produced in this way preferably comprises at least one connection output for electrical wires emerging from the sensor and flexible pins extending axially and cooperating with receptacles made in the non-rotating part, notably in the non-rotating ring of the roller bearing for assembly purposes.

The second end shield provided with radial teeth can be mounted on the non-rotating element independently of the sensor. In which case the invention provides a third end shield which is made integral with the sensor and with the first end shield in the form of a rigid annular block by means of encapsulation with a plastic material. In the assembled position the third end shield is preferably in direct contact with the second end shield in order to be able to form a continuous magnetic circuit between the second toothed end shield and the third end shield.

The end shields constituting the magnetic flux concentrating means are preferably produced using a ferromagnetic material.

The multipolar ring is preferably made integral with the rotating element, notably with the rotating ring of the roller bearing, by means of an annular support which is integral with the external perimeter or internal perimeter of the multipolar ring. The support for the multipolar ring may be simply shrunk fitted into the rotating ring of the roller bearing.

The sealing lip of the first end shield comes into frictional contact in an advantageous manner against the multipolar ring support.

The invention will be better understood by studying the detailed description of several embodiments taken by way of non-restrictive examples and illustrated by the attached drawings in which.

Figure 1:
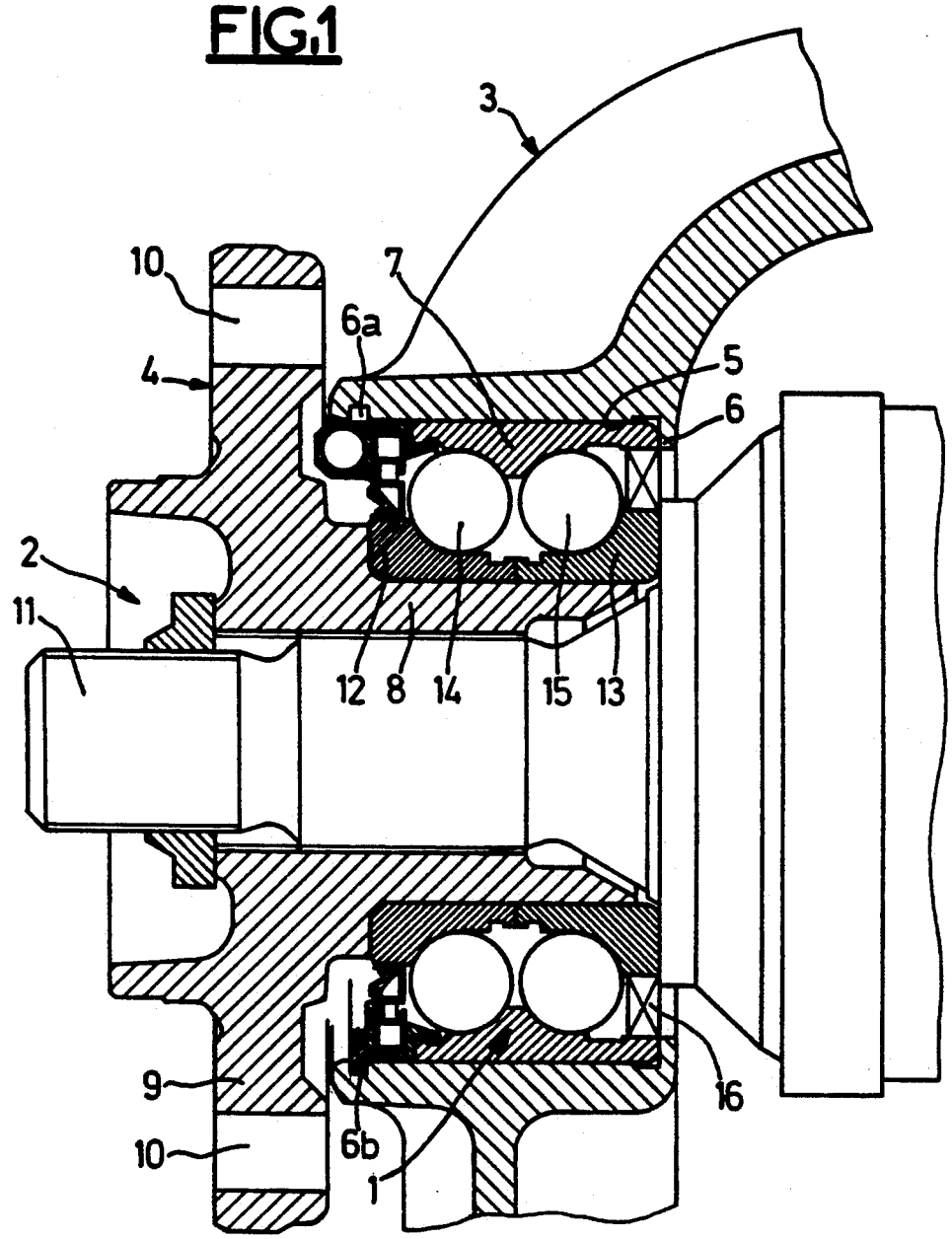
FIG. 1 is a partial view of an axial section of a roller bearing hub equipped with a speed sensing device according to the invention.

In order to promote understanding of the invention, these parts which are common to all the FIGS. 1 to 7 will bear the same reference numerals. The example of application of the invention is chosen in order to measure the speed of rotation of a roller bearing hub for a driven wheel of a vehicle. Of course, the invention applies equally for non-driven wheels.

As illustrated in FIG. 1, the speed sensing device according to the invention is integrated in a roller bearing 1 with which a hub of a driven wheel 2 is equipped.

The hub 2 comprises a fixed part 3 which is integral with the vehicle and a rotating part 4. The fixed part 3 has a cylindrical bore 5 of which one end is provided with a shoulder 6 forming an axial stop for the external non-rotating ring 7 of the bearing 1 which is rendered immobile in the cylindrical bore 5 of the nonrotating part 3.

The other end of the bore is provided with a channel 6a intended for receiving an elastic ring 6b of the circlips type.

The rotating part 4 has an axial tubular protuberance 8 and a collar 9 extending radially in order to serve as an attachment support for a wheel (not illustrated) by means of bolts (not illustrated) passing through the axial holes 10 on the collar 9. The rotating part 4 is mounted fixedly in terms of rotation with respect to a drive axis 11 passing through the axial tubular protuberance 8 internally.

The roller bearing 1 comprises two rotating internal half rings 12, 13 which are made integral with the external face of the tubular protuberance 8 of the rotating part 4 of the hub. Between the external ring 7 and the two internal half rings 12, 13 two series of balls 14, 15 with oblique contact maintained with a suitable spacing by a cage (not illustrated) are mounted.

The lateral sealing of the roller bearing is ensured on one side which is adjacent to the shoulder 6 of the fixed part 3 by a sealing joint of conventional type 16 and on the other side by the device of the invention.

When the drive shaft 11 is driven in rotation it drives the wheel (not illustrated) in rotation by means of the turning part 4 of the hub 2. The internal half rings 14, 15 of the roller bearing 1 are driven in rotation also by means of the rotating part 4 of the hub whilst the external ring 7 of the roller bearing 1 remains non-rotating due to the two series of balls 14, 15 of the bearing 1.

Figure 2:
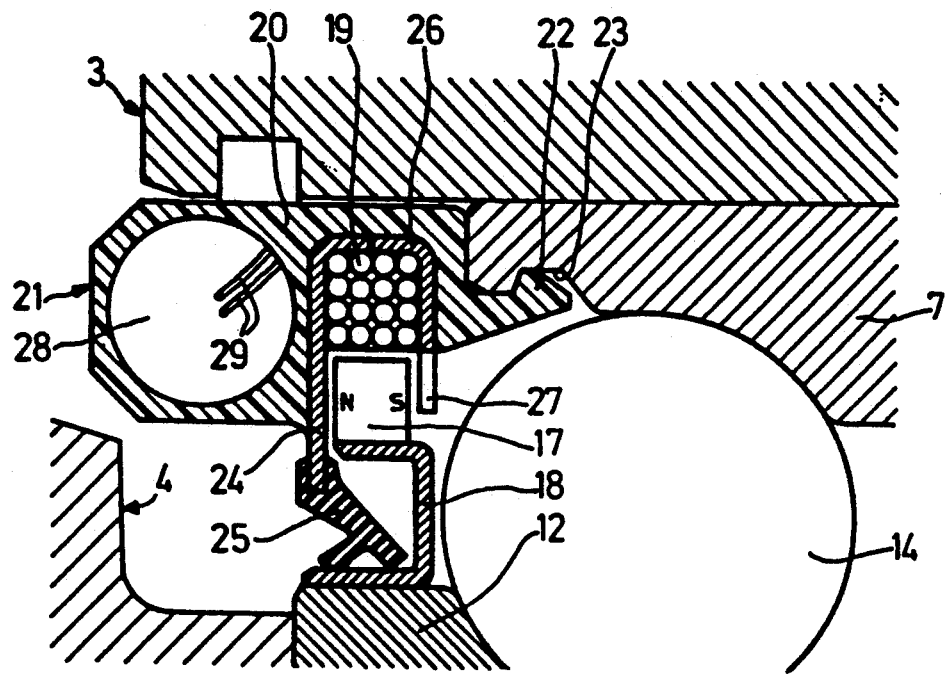
FIG. 2 is a partial view of a detail of FIG. 1 showing the sensing device according to a first embodiment of the invention.

As illustrated in FIG. 2, the rotational speed sensing device according to the invention comprises on the one hand a coding element in the form of a multipolar ring 17 mounted on an annular support 18 of a U-shaped cross-section with arms directed axially and which is shrunk fitted onto the external cylindrical face of the rotating internal half ring 12 which is located opposite the shoulder 6 of the fixed part 3, and on the other hand a sensor 19 and a magnetic flux concentrating means with an encapsulation 20 in rigid plastic material in the form of an annular block 21.

The annular block 21 has flexible pins 22 extending axially in order to be able to snap into an annular receptacle 23 made in a lateral side of the fixed external ring 7 of the roller bearing. The lateral side in question of the external ring 7 is set back axially with respect to the lateral side of the corresponding internal half ring 12. In this way, the device of the invention can be conveniently integrated with the roller bearing in a sufficient axial space.

The multipolar ring 17 consists of a plurality of magnetised segments arranged in a regular and alternating fashion along a circular path. Each segment is axially magnetised. The support 18 for the multipolar ring 17 is produced in an annular form of a U-shaped radial cross-section. On the external face of an arm of the U-shaped support 18 the multipolar ring 17 is fixed.

The magnetic flux concentrating means comprises a first annular end shield 24 in an upside down L shape with a part extending radially towards the internal half ring 12 and provided with a sealing lip 25 which enter into frictional contact with the other arm of the U-shaped support 18 for the multipolar ring 17. In this way, the device of the invention is effectively protected from the external environment.

The magnetic flux concentrating means comprises a second end shield 26 in an annular shape with an L-shaped cross-section of which one arm extends radially towards the internal half ring 12 and terminates in radial teeth 27 distributed in a regular fashion over a circular path. The other arm of the second end shield 26 extends axially and comes into contact with the second arm of the first end shield 24. In the space formed between the end shields 24 and 26, the sensor 19 of the passive type in the form of an induction coil is mounted.

The multipolar ring 17 is located in the axial space between the radial part of the first end shield 24 on the one hand and the radial teeth 27 of the second end shield 26 on the other with the total of air gaps in the axial direction thus being largely constant. The result is that the signal generated by the sensor 19 by means of the first and second end shields 24 and 26 of the magnetic flux concentrating means is virtually insensitive to air gap variations between the rotating multipolar ring 17 and the magnetic flux concentrating means.

Figure 8:
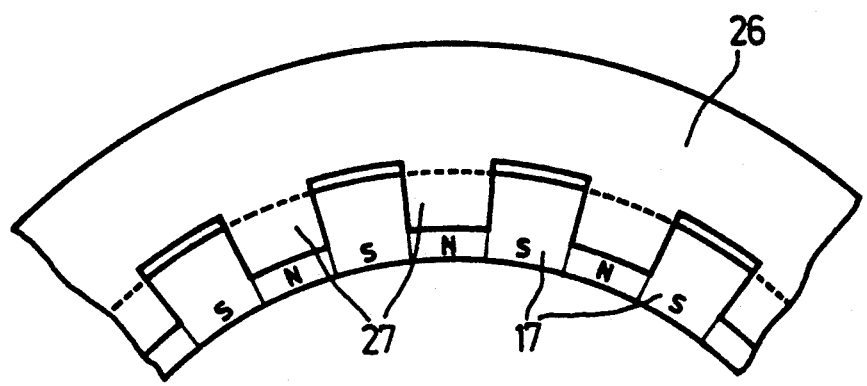

Moreover, the radial teeth 27 of the second end shield 26 are distributed over the circumference so as to be located simultaneously opposite magnetic segments of the same polarity constituting the multipolar ring 17 (FIG. 8). In an advantageous fashion, the number of radial teeth 27 is equal to the number of segments of the same polarity. It is also possible to have fewer radial teeth than segments of the same polarity. In this way, the fluxes individually generated by segments of the same polarity are added together to be concentrated and channelled by the flux concentrating means, in particular by the first and second end shields 24, 26 in order to increase the intensity of the electrical current induced in the sensor 19.

Figure 3:
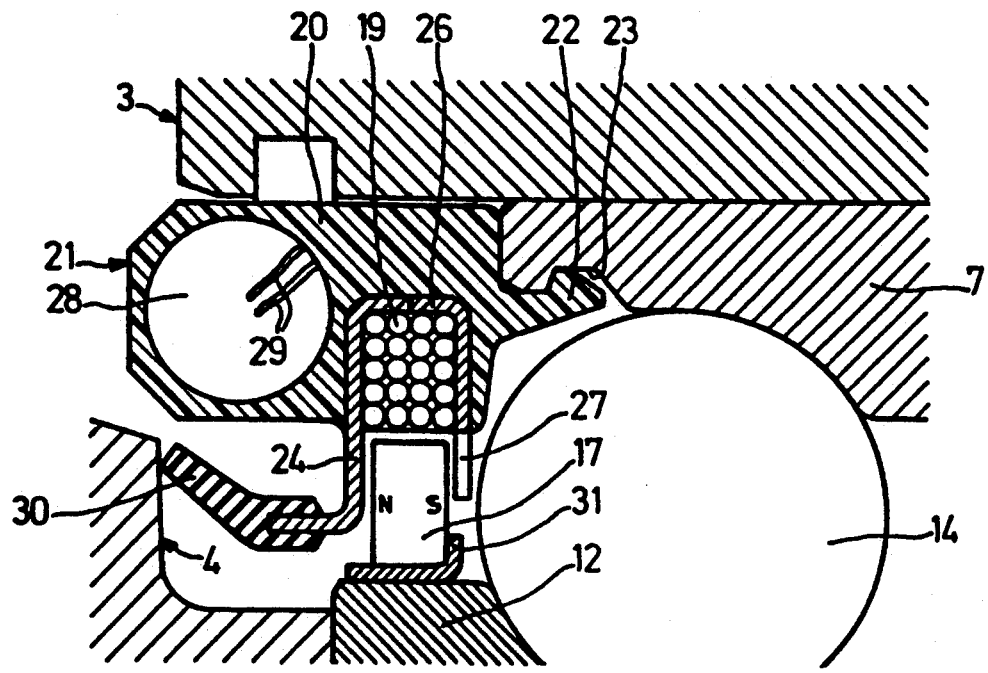
FIG. 3 is a partial view of an axial section of the sensing device according to a second embodiment of the invention.

In the rigid block 21 a connection output 28 for electrical wires 29 which emerge from the sensor 19 is provided. Means for processing the signal (not represented) are connected to the electrical wires 29 in order to manage the signal supplied by the sensor 19 and to control for example an antilocking brake system (ABS) with which the hub of the wheel is equipped The embodiment illustrated in FIG. 3 is similar to that in FIG. 2. The first end shield 24 of the magnetic flux concentrating element comprises a radial part which terminates in an axial elbow provided with a sealing lip 30 which comes into frictional contact with the rotating part 4. The multipolar ring 17 is smaller in diameter than that in FIG. 2 and is mounted by means of its support 31 of L-shaped annular cross-section.

Figure 4:
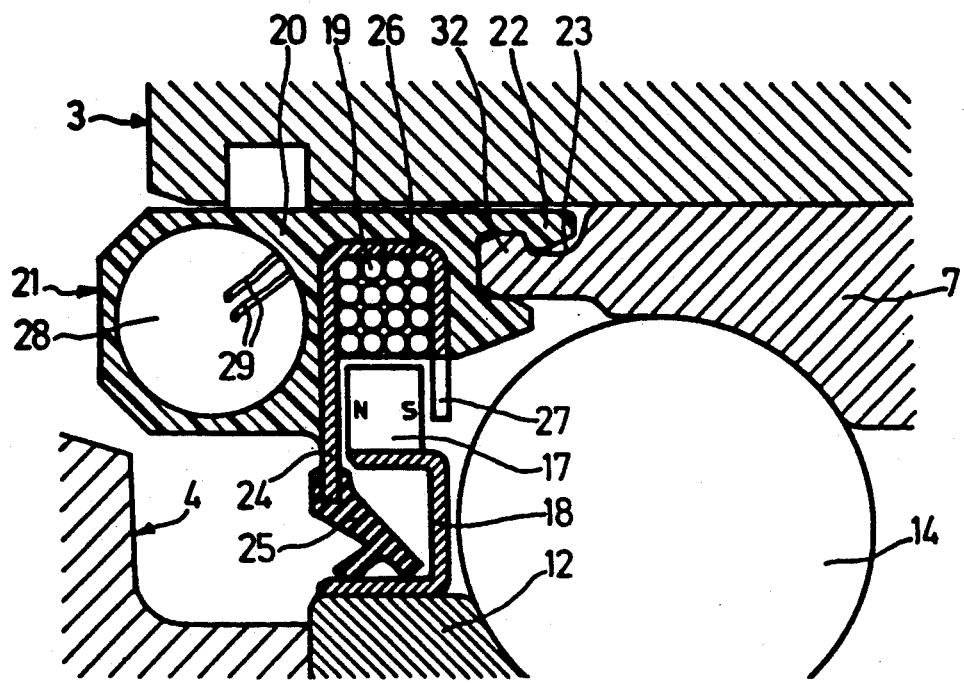
FIG. 4 is a partial view of an axial section of the sensing device according to a third embodiment of the invention.

The embodiment illustrated in FIG. 4 only differs from that in FIG. 2 with respect to the means of assembly of the rigid annular block 21 on the external ring 7 of the roller bearing. In fact in this example, the axial pins 22 snap into an annular receptacle 23 oriented radially towards the outside instead of an annular receptacle which is oriented radially towards the inside as in FIG. 2. In addition, the annular rim 32 of the lateral side of the outside ring 7 of the roller bearing is thus encased in the rigid block 21 when the axial pins 22 snap into the external annular receptacle 23.

Figure 5:
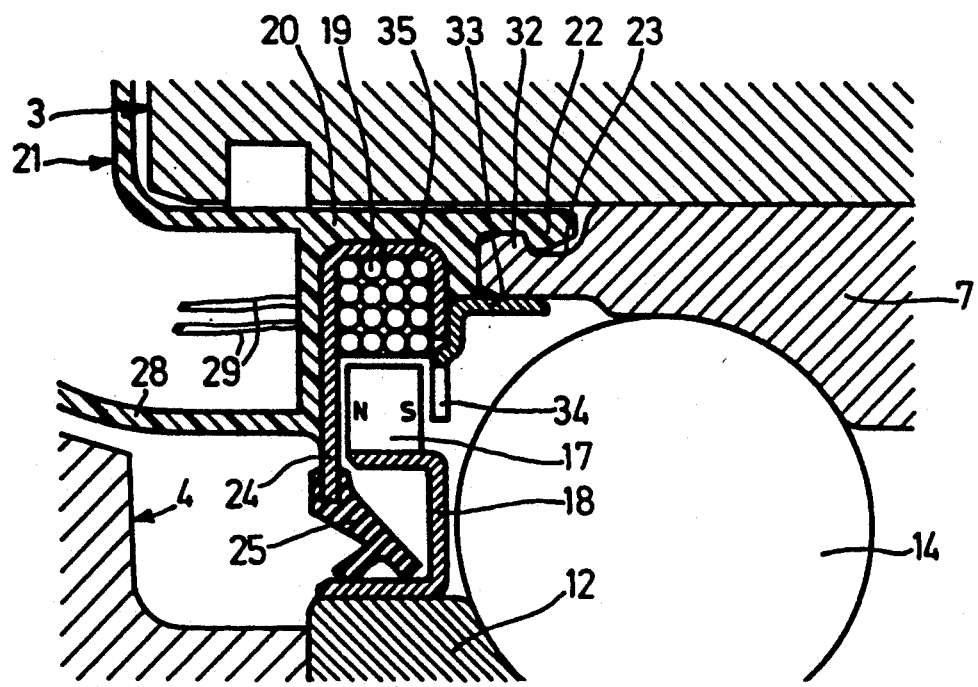
FIG. 5 is a partial view of an axial section of the sensing device according to a fourth embodiment of the invention.

In FIG. 5, an embodiment of the rotational speed sensing device is illustrated which differs from the embodiment illustrated in FIG. 2 in the following points.

The magnetic flux concentrating means here comprises a first end shield 24 identical to that in FIG. 2, a second annular end shield 33 comprising an axial part which is shrunk fitted into the cylindrical bore of the external ring 7 of the roller bearing and a radial part provided with radial teeth 34 similar to the teeth 27 in FIG. 2, and a third annular end shield 35 of L-shaped cross-section in contact with the radial part of the second end shield 33 in order to be able to form a continuous magnetic circuit between the second and third end shields 33 and 35.

The passive type sensor in the form of an induction coil is mounted between the first and third end shields 24, 35. The rigid block 21 comprises a connection output 28 oriented firstly axially and then radially towards the outside instead of being oriented tangentially as in FIG. 2.

Figure 6:
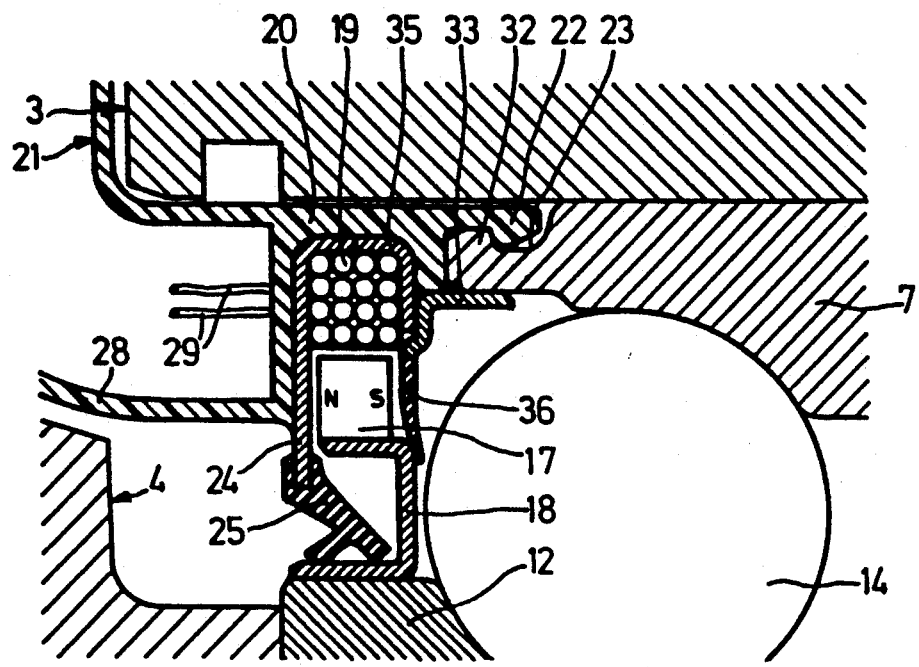
FIG. 6 is a partial view of an axial section of the sensing device according to a fifth embodiment of the invention.

FIG. 6 shows a speed sensing device which is virtually identical to that in FIG. 5 with the only difference being the presence of sealing lips 36 between the radial teeth 34 and coming into frictional contact with the annular support 18 for the multipolar ring 17.

The presence of sealing lips 36 permits the multipolar ring 17 and the sensor 19 to be separated off with respect to the space where the series of bearing balls 14 is located.

In the same way, in all the other embodiments of the invention, it is possible to equip the spaces between the radial teeth 27 of the magnetic flux concentrating means with sealing lips.

Figure 7:
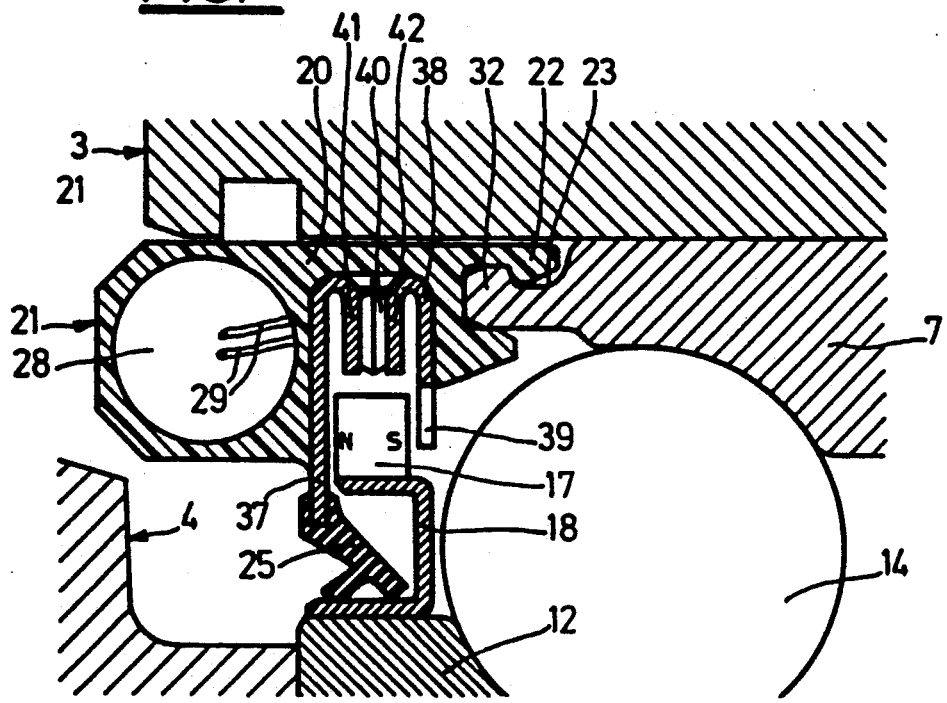
FIG. 7 is a partial view of an axial section of the sensing device according to a sixth embodiment of the invention; and, FIG. 8 is an axial view of a portion of the multipolar ring and an associated end shield with radial teeth.

In FIG. 7 a device of the invention with an active sensor 40, for example a Hall-effect sensor, is mounted. The flux concentrating means in FIG. 7 only differs from the flux concentrating means in FIG. 4 in the fact that the annular end shields 37, 38 of the said flux concentrating means each comprise an individual tongue 41, 42 folded radially towards the centre of rotation of the device and placed at a specific location on the periphery of the corresponding end shield 37 or 38. The two ends shields 37, 38 are oriented in terms of angle with respect to one another in such a way that the tongues 41, 42 are opposite one another, the active sensor 40 being arranged between the said tongues. The remainder of the elements of the device of the invention is identical to the device illustrated in FIG. 4.

The magnetic flux concentrating means with three end shields as illustrated in FIGS. 5 and 6 in place of two end shields in the other embodiments have the main advantage of permitting assembly and disassembly of the annular rigid block 21 independently of the multipolar ring 17.

We claim:
1. A device for sensing the rotational speed of a rotating element mounted on a non-rotating element by means of a roller bearing, said device comprising:
coding means integral with the rotating element, said coding means having a multipolar ring which has a plurality of magnetic segments with regularly and alternately arranged magnetic poles for producing an alternating magnetic field during rotation;

sensor means made integral with the non-rotating element, and magnetic flux concentrating means of annular shape arranged in the immediate vicinity of the multipolar ring and cooperating with the sensor means in order to concentrate and channel magnetic flux emitted by the multipolar ring, the flux concentrating means including a first end shield and a second end shield, said first end shield including a radial part with a circular edge provided on its circumference with a sealing lip for providing a seal between the rotating and non-rotating elements, said second end shield having radial teeth which are spaced regularly along a circular path, said multipolar ring being axially magnetized and arranged in an axial space which lies between the radial part of the fist end shield and the radial teeth of the second end shield, said radial teeth simultaneously being axially aligned with magnetic poles of the same polarity of the multipolar ring.

2. Device according to claim 1, wherein at least the sensor means and the fist end shield of the flux concentrating means are part of a rigid annular block made by encapsulation with a plastic material, the block having flexible pins extending axially and snapping into an annular receptacle made in the non-rotating element.

3. Device according to claim 2, wherein the second end shield is part of the rigid annular block and cooperates with the first end shield in order to form a space for mounting the sensor.

4. Device according to claim 2, wherein the flux concentrating means includes a third end shield which is part of the rigid block in order to form a space for mounting the sensor, and the second end shield is mounted directly on the non-rotating element and comes into contact with the third end shield in order to form a continuous magnetic circuit with the second and third end shields.

5. Device according to claim 1, wherein the multipolar ring is made integral with said rotating element by means of a support which is shrunk fitted onto the said rotating element.

6. Device according to claim 5, wherein the second end shield of the magnetic flux concentrating means is provided with sealing lips between the radial teeth and coming into frictional contact with the annular support for the multipolar ring.

7. Device according to claim 5, wherein the support for the multipolar ring is annular and has a U-shaped cross-section with arms which are oriented axially.

8. Device according to claim 7, wherein the sealing lip is in frictional contact with one arm of the U-shaped support.

9. Device according to claim 1, wherein the sensor includes an induction coil which is enclosed in two end shields of L-shaped cross-section which are in contact with one another.

10. Device according to claim 9, wherein the second end shield of the magnetic flux concentrating means is provided with sealing lips between the radial teeth and coming into frictional contact with the annular support for the multipolar ring.

11. Device according to claim 1, wherein the sensor is of the active type selected from the group consisting of a Hall-effect probe and a magnetoresistor, and is mounted between two tongues, each of the tow tongues being derived respectively from an end shield of the magnetic flux concentrating means.

12. Device according to claim 11, wherein the second end shield of the magnetic flux concentrating means is provided with sealing lips between the radial teeth and coming into frictional contact with the annular support for the multipolar ring.

13. Device according to claim 1, wherein the number of radial teeth of the second end shield of the flux concentrating means is equal to the number of magnetic segments of the same polarity constituting the multipolar ring.

* * * * *